Sept. 18, 1928.
R. W. JENKINS
1,684,832
COMBINATION DOOR JAMB AND HANDHOLD
Filed Aug. 11, 1927
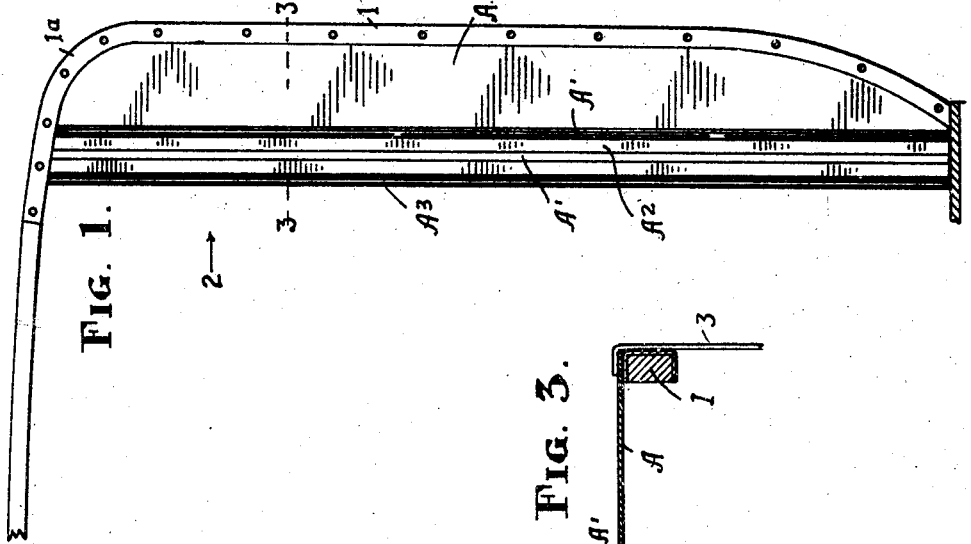
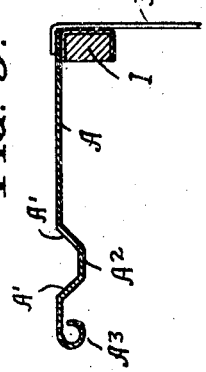
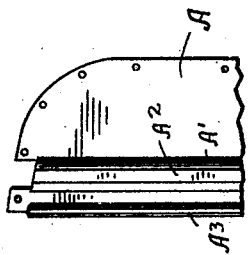
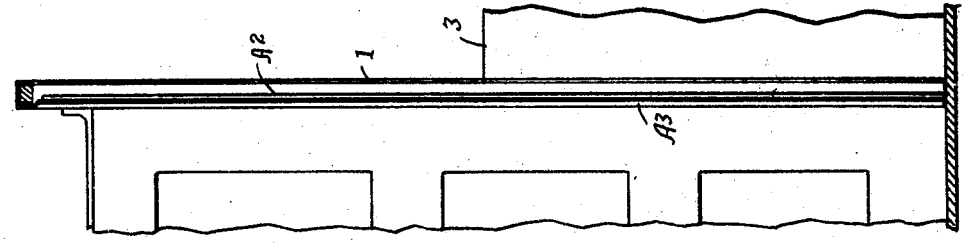
INVENTOR
RALPH W. JENKINS.
By Thomas L. Ryan
ATTORNEY.

Patented Sept. 18, 1928.

1,684,832

UNITED STATES PATENT OFFICE.

RALPH W. JENKINS, OF DALEVILLE, INDIANA.

COMBINATION DOOR JAMB AND HANDHOLD.

Application filed August 11, 1927. Serial No. 212,343.

This invention relates to improvements in the interior construction of automotive vehicle bodies, and has reference especially to bodies of that class comprising busses and passenger carrying vehicles.

At the door-opening of vehicle bodies of this class, there is the provision of a suitable door casement having the usual jamb against which the vertical edge of the folding and extensible door makes seated engagement when it is moved to the closed position. As a necessary brace or support element which the passenger may take hold of in his making ingress or egress at the door opening, a smooth vertical hand-hold rod or column is maintained in secure position adjacent to the said door casement and jamb.

In connection with improvements which I have recently completed consisting of pillar construction described in my application for Letters Patent thereon, filed August 10, 1927, Serial No. 211,894, and which said pillar construction embodies an arcuate hip element having an open shank that supports the end of the roof rafter, I have now devised a combination door-jamb and hand-hold which forms the subject of the present specification and claims.

An object of the invention is to provide improvements in construction whereby space may be conserved, and at the same time the body construction is strengthened and the cost thereof is minimized, and the necessity of using an isolated or unit type of hand-hold bar is eliminated. Other and more specific purposes of the invention are to provide a door-jamb and hand-hold which is adaptable for use in vehicle body construction generally, and which device is durable and of rugged strength, neat in appearance, relatively light in weight, and is capable of being economically manufactured.

My invention is illustrated in the accompanying drawings, and is described in the following specification, and defined in the appended claims.

The several parts of the invention are identified by suitable characters of reference applied thereto in the different views in the drawings, in which—

Figure 1 is a view showing my new and improved combination door-jamb and handhold installed in position, in connection with my improved pillar construction.

Figure 2 is a view, taken in the direction of the arrow 2 in Figure 1.

Figure 3 is an enlarged horizontal cross section view, taken on the line 3—3 in Figure 1; and Figure 4 end portion of the plate in readiness for connection to the support member.

My invention consists of a stout sheet metal plate A which may be of a width of about ten inches, and is preferably of about number twenty gauge, or three thirty seconds of an inch in thickness. The plain straight side of this plate is adapted to be secured to the side of the pillar or upright member 1, the top portion thereof being secured to the hip $1^a$ of said pillar, as shown in Figure 1. The opposite portion of the said plate has formed therein by pressing, a continuously extending groove which is of such formation in cross section, that the beveled sides $A^1$ and $A^1$, and the straight seat $A^2$, are provided. The edge portion of the said plate is curled or rolled upon itself in such manner that the smooth and rounded hand-hold $A^3$ is provided.

My improved door-jamb and hand-hold provides a stout frame member and seating recess for the door and a hand-hold. The groove or channel-way and the curled edge while performing the functions above described, also perform the function of stiffening this structural element or frame plate, both transversely and longitudinally. The hand-hold is entirely as efficient for the purposes for which it is intended, as such, as is an isolated individual post or shaft for the same purpose. The plain edge of the said plate A may be secured to the side or portion of the pillar as may be preferred, having reference to the securing of the siding material 3 of the vehicle body.

It is contemplated that this improved door-jamb and hand-hold may be furnished in standard stock lengths and widths, to be used as may be required on special construction; or in lengths and widths and with top and bottom of contour formation to fit the pillar construction for which it may be specially intended. It is obvious that there may be minor modifications in the invention, within the scope of same as defined by the appended claims, without departing from the spirit or principle of the invention. In preparing the plate for connection to a support member that may extend across same, the seat portion A² and the sides A¹ and A¹ of the channel, and also the body portion of the hand-hold A³ are cut away, sufficiently to permit of the passing of the support member, as shown in Figure 4.

What I claim as my invention, and desire to secure by Letters Patent, is—

1. In combination with a pillar having integrally formed inturned hip, a vertical door frame member embodying an integrally formed door recess or channel, and an integrally formed rounded hand hold.

2. A combination door-jamb and hand-hold, consisting of a sheet metal plate of suitable length having an integrally formed longitudinal channel, and an integrally formed rounded hand-hold adjacent thereto.

RALPH W. JENKINS.